March 7, 1950 W. G. MINDER 2,499,770
WHEEL BALANCING DEVICE
Filed March 12, 1945 2 Sheets-Sheet 1

INVENTOR
BY William G. Minder
Watson, Cole, Grindle & Watson
ATTYS.

March 7, 1950 W. G. MINDER 2,499,770
WHEEL BALANCING DEVICE
Filed March 12, 1945 2 Sheets-Sheet 2

INVENTOR
BY William G. Minder
Watson, Cole, Grindle & Watson
ATT'YS.

Patented Mar. 7, 1950

2,499,770

UNITED STATES PATENT OFFICE 2,499,770

WHEEL BALANCING DEVICE

William G. Minder, Atlanta, Ga.

Application March 12, 1945, Serial No. 582,236

10 Claims. (Cl. 301—5)

The present invention relates to devices by means of which wheel balancing weights may be readily and securely attached to vehicle wheels.

It is now common practice on the part of motor vehicle operators to frequently inspect the wheels of their vehicles, especially those equipped with pneumatic tires, and to affix to the rim of any such wheel which is found upon examination to be somewhat out of balance one or more relatively small weights in order to bring the wheel as a whole into a condition of perfect balance about its axis of rotation. The life of the wheel bearing and the life of the tire mounted on the wheel are prolonged if the wheel with which they are associated is kept in perfect balance. As the tread of the tire wears away a tire equipped wheel previously in perfect balance may reach a condition of unbalance requiring correction and the necessary correction may be effected by adding a weight where needed or by shifting a previously applied weight circumferentially of the wheel, or by substituting for a weight of given size or mass located at one point adjacent the periphery of the wheel, a weight of larger or smaller size or mass.

In order to facilitate rapid adjustments of this character, I have provided a weight retainer which may be readily attached to the rim of a wheel so as to form a permanent part thereof, this retainer having a number of novel features of construction which render it superior in actual operation to weight retaining devices of types heretofore designed or suggested for use. The improved weight retainer is of simple and rugged construction, readily fabricated in the first instance, easily applied, readily understood by motor vehicle servicemen, and extremely efficient in actual operation. Two forms of the retainer will be illustrated and described by way of example, but it will be appreciated that the design and arrangement of its several parts may be modified in adapting the retainer to wheel assemblies which vary in type or form.

Figure 1:
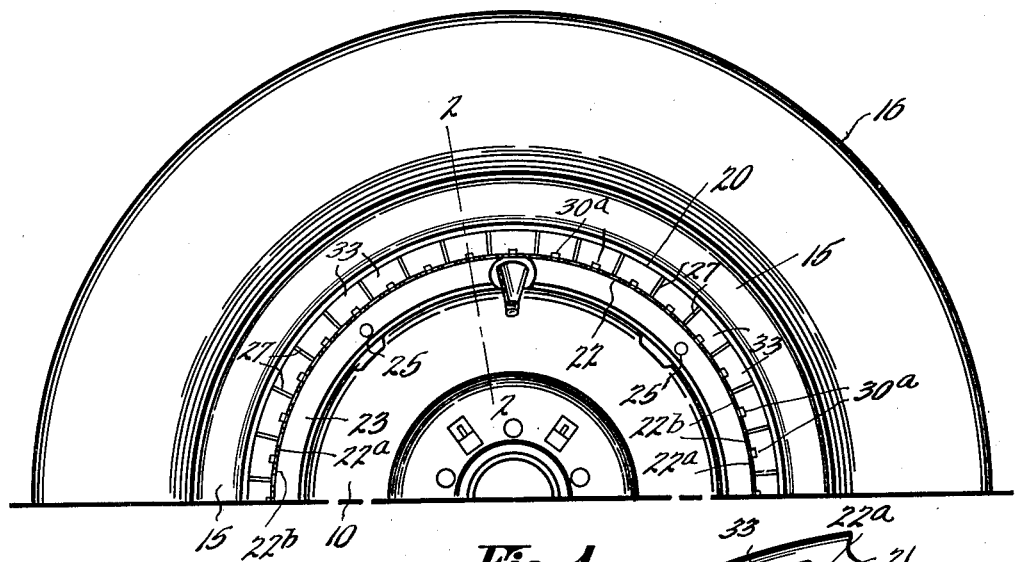
Figure 1 shows in side elevation one-half of a wheel construction to which the retainer has been applied.

The wheel structure shown in the drawing is of common type and is illustrated by way of example only. It includes the central disc portion 10 and the drop center rim indicated generally at 11. The periphery of the disc portion 10 is substantially cylindrical and closely engages the inner surface of the cylindrical central band 12 of the drop center rim. The rim 11 is preferably formed in one piece and is symmetrical with respect to a plane normal to the wheel axis, the edges of the central portion or band 12 merging with the lower edges of the upwardly and outwardly inclined flange portions 13, the inclined flanges 13 merging at their upper or outer edges with the substantially cylindrical tire bead-receiving bands 14, and the outer edges of bands 14 in turn merging with the lower inner edges of the tire retaining flanges 15. An ordinary pneumatic tire casing is indicated at 16. To the drop center rim illustrated in Figure 2 there have been applied two weight retainers, each generally indicated at 20, one being secured to each inclined flange portion 13 of the rim. Only one may be needed and the invention is in nowise limited to the use of two such retainers on a single wheel, the use of one or more being entirely optional.

The novel weight retainer comprises two generally cylindrical weight retaining parts 21 and 22, respectively, these parts being disposed about a common axis so as to define between them a continuous or annular weight receiving slot or recess. In addition the weight retainer includes a part 23 which may be designated a rim engaging part since it is that part of the retainer which engages and is attached to the rim, part 23 also connecting the inner and outer weight retaining members 21 and 22 and maintaining these members at all times in fixed spaced relationship. Preferably the part 23, which is frusto-conical in the form of the invention shown so as to closely engage the frusto-conical outer surface of the inclined flange 13 of the rim, is formed as a part of one or the other of the cylindrical members 21 or 22, in the form shown in Figures 1, 2 and 3 of the drawings the rim engaging part 23 merging with the outer cylindrical member 21 of the weight retainer. When applied to a wheel construction rivets such as indicated at 25 may be passed through flange 13 of the wheel rim and through part 23 of the weight retainer, the heads of the rivets being up-set. If desired, means for detachably securing the weight retainer in the position shown may be utilized. The outer member 21 of the retainer is preferably so dimensioned that its outer surface seats snugly against the inner surface of the encircling flange portion 14 of the drop center rim so that forces applied to the outer member 21 of the retainer, which is of relatively light weight, by the weights housed within the retainer and as a result of centrifugal action, will not have the effect of rendering the retainer eccentric. The inner member 22 is secured to the rim engaging part 23 by welding.

Figure 3:
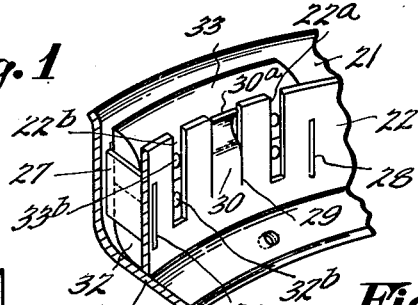
Figure 3 is a perspective view of a short section of the retainer.
Figure 2:
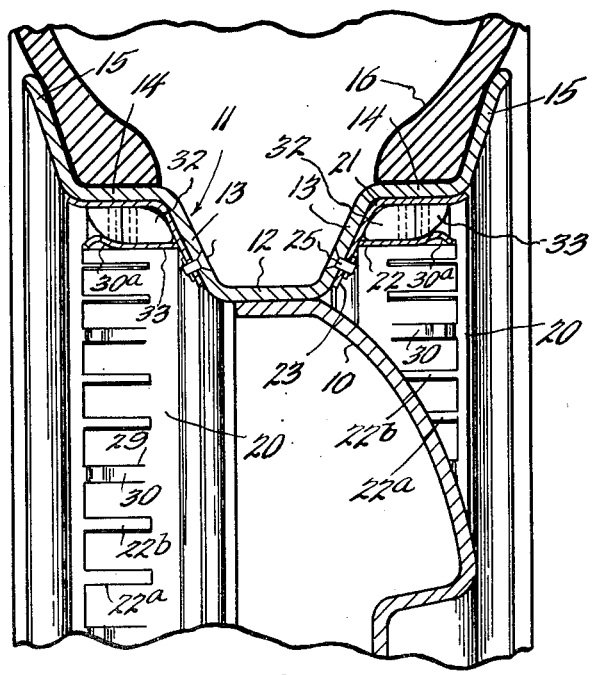
Figure 2 is a section on line 2—2 of Figure 1, upon a somewhat larger scale.

As clearly shown in Figures 2 and 3 of the drawings the annular space between the outer and inner members 21 and 22 of the retainer is divided into a circular series of weight-receiving pockets by partitions 27. Partitions 27 are equidistantly spaced apart and each preferably comprises a tongue struck from the outer member 21, leaving an aperture 21′ in such member, each of the partitions being disposed in a plane which includes the axis of the weight retainer and the end thereof remote from the outer member 21 being received within a slot 28 formed in the inner member 22 of the retainer, as shown in Figure 3.

As shown in this figure the inner weight retaining member 22 is slotted at 22a and 22b for the reception of weight engaging and manipulating tools (not illustrated) and, intermediate slots 22a and 22b of each pocket, member 22 is cut or incised as at 29, the parallel incisions 29 defining a resilient tongue or spring finger 30 the free end of which is outwardly up-set, as indicated at 30a, this spring finger comprising a weight retaining means.

Figure 4:
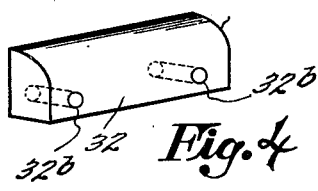
Figures 4 and 5 are perspective views, respectively, of two weights, differing in size, which may be applied to the retainer in the balancing of a vehicle wheel.
Figure 5:
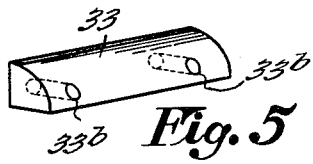

The weights which are used in association with the weight retainer are of different values, differing in size and somewhat in shape as may be seen from an inspection of Figures 4 and 5. The arrangement is such, however, that, while they are of two sizes, either one or both weights, or two weights of the same size, may be placed in a single pocket and, whether either or both are actually placed in any such pocket, the spring finger 30 is effective in accomplishing its intended weight retaining function. Thus, if a larger weight 32 is placed in a pocket, as indicated in Figure 2 of the drawings, in the position shown in that figure, the associated spring finger 30 will serve to retain the weight in that position, there is, of course, little tendency for the weight to escape from the pocket after it has been inserted, the only substantial force to which the weight is subjected being the centrifugal force tending to throw it outwardly as the wheel rotates. The action of spring finger 30, however, will retain the larger weight against any movement toward the mouth of the pocket in which it is held, whether or not a smaller weight 33 has also been inserted into this pocket, as illustrated in Figure 2.

The larger weight may, for instance, be one ounce and the smaller weight one-half ounce and they are provided with surfaces which are coextensive in area and similarly formed. These surfaces are brought into substantially full contact when the two weights are nested or both placed in a single pocket. With both weights 32 and 33 in one pocket the curved outer surface of the smaller weight 33 is closely engaged by the up-set portion 30a of the associated spring finger and the weights may not be removed except upon the application of substantial forces, sufficient to draw them past this latching portion of the spring finger. Each weight is provided with tool-receiving apertures or recesses, weight 32 having two such recesses 32b and weight 33 having two similar recesses 33b. When the weights are positioned as shown in Figures 2 and 3 the apertures 32b of weight 32 are in registration with slots 22a and 22b of the inner cylindrical weight retaining member 22 so that parallel prongs of a weight manipulating tool may be thrust upwardly through the slots and into the tool-receiving apertures of the weight, thus enabling one engaged in balancing the wheel to readily withdraw it. The tool-receiving apertures of the outer or smaller weight 33 are likewise accessible to the weight manipulating tool through the slots 22a and 22b. The weights may be inserted into the pockets with the help of a tool of special character, as well as removed with the aid of such tool.

By inserting in any weight receiving pocket either a larger weight or a smaller weight, or both, the balance of an out-of-balance wheel assembly may be improved or made perfect. In some cases it may be necessary to apply one or more weights in adjacent pockets in order to obtain the desired degree of balance. By reason of the nature of the retainer, however, one whose duty it is to maintain any wheel structure equipped with the retainer in perfect balance may do so with the expenditure of a minimum amount of time. The retainer is securely held in position at all times, is itself light in weight and compact, simple in construction and inexpensive to fabricate.

Figure 7:
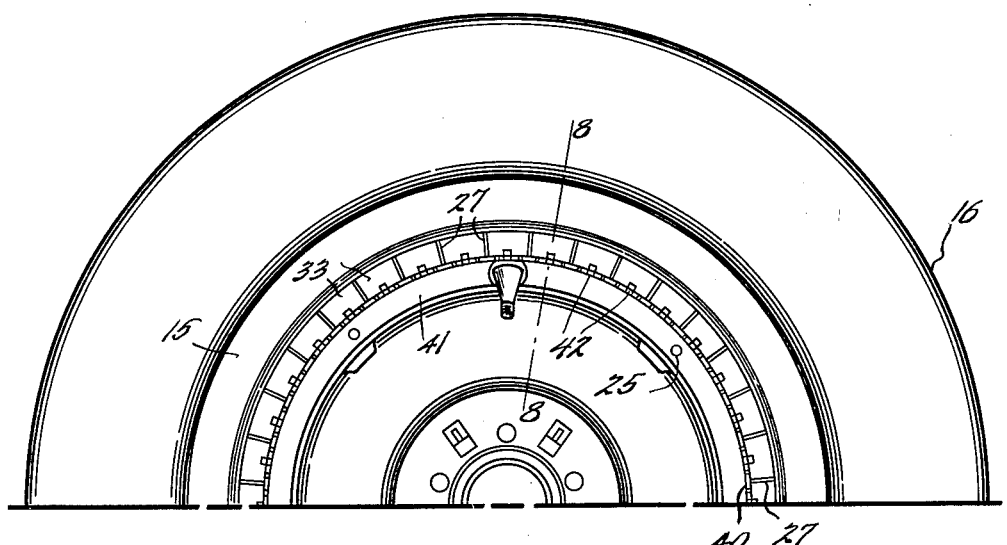
Figure 7 is a view similar to Figure 1 but showing affixed to the vehicle wheel a weight retainer of somewhat different type.
Figure 6:
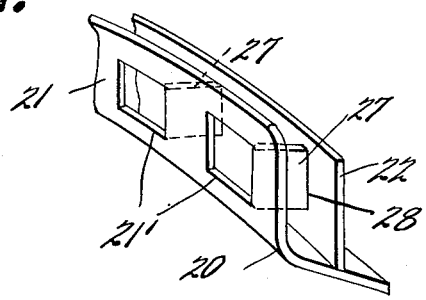
Figure 6 is a view somewhat similar to Figure 3, showing in perspective a short section of the retainer, this section, however, being viewed from a different point.
Figure 8:
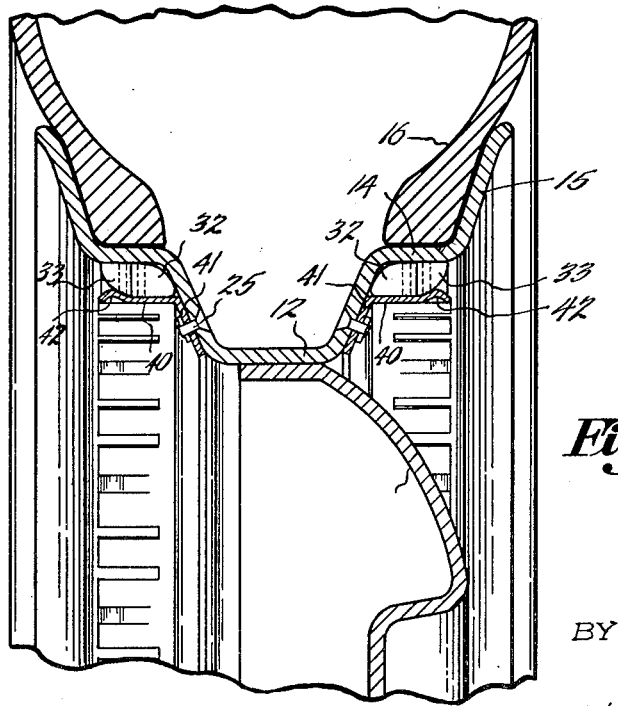
Figure 8 is a section on line 8—8 of Figure 7, upon a somewhat larger scale.

In some instances it may be possible to employ a retainer in which the outer cylindrical retaining band is omitted and such a retainer is shown in Figures 7 and 8. Here the only cylindrical retaining member 40 is integral with the rim-engaging part 41 and the outer weight retaining band or cylinder is replaced by the flange 14 of the rim. The diameter of the weight retaining band 40 is such that it forms, with the parallel tire bead-receiving band 14 of the drop center rim, an annular weight receiving recess of the proper and necessary width. The member 40 is preferably formed exactly as the member 22 of that form of the invention first described, being slotted for the reception of weight applying tools and having spring fingers 42 for the retention of the weights. When this form of the invention is employed the annular weight receiving space may or may not be divided into pockets. If it is desirable that this annular space be divided into pockets suitable division members may be separately formed and attached to member 40 or small tongues may be struck outwardly from member 40 so as to form radially projecting partitions. Other minor changes may be effected and, in particular, the shapes of those portions of the retainer which are intended to engage and fit against outer surfaces of the drop center rim may be varied as the precise shape of the rim varies from wheel construction to wheel construction.

Having thus described the invention, what is claimed as new and desired to be secured by Letters Patent is:

1. A weight retainer for attachment to the rim of a vehicle wheel comprising an annular member having two coaxial generally cylindrical parts together defining an annular weight receiving recess, and a rim engaging part to which both of said first mentioned parts are rigidly attached and by means of which they are maintained in fixed spaced relation, and radially disposed partitioning members dividing said annular weight receiving space into pockets.

2. A weight retainer for attachment to the rim of a vehicle wheel comprising an annular member having two coaxial generally cylindrical parts together defining an annular weight receiving recess, and a rim engaging part to which both of said first mentioned parts are rigidly attached and by means of which they are maintained in fixed spaced relation, and a plurality of tongues struck from one of said generally cylindrical parts and extending radially toward the other for dividing said annular weight receiving space into pockets.

3. The combination with an annular weight retainer adapted to be attached to a vehicle wheel rim, of a plurality of weights of different sizes, said retainer having a circularly arranged series of weight receiving pockets, each pocket having resilient weight engaging and holding means for engaging and holding weights singly or in multiple.

4. A weight retainer for attachment to the rim of a vehicle wheel comprising concentric cylindrical parts fabricated of sheet material and together defining a weight-receiving and retaining slot and a sheet material part extending across and forming the rear wall of such slot, the innermost of said cylindrical parts being provided with slots extending parallel to the axis thereof, pairs of adjacent slots defining weight-retaining spring fingers.

5. The combination with an annular weight retainer adapted to be attached to a vehicle wheel rim, of a plurality of weights of different sizes, said retainer having a circularly arranged series of weight-receiving pockets, each pocket being adapted to receive one or more weights, and said weights being recessed for the reception of weight manipulating tools, at least one wall of each said pocket being slotted to receive a weight manipulating tool.

6. The combination with an annular weight retainer adapted to be attached to a vehicle wheel rim, of a plurality of weights of different sizes, said retainer having a circularly arranged series of weight receiving pockets, each said pocket being adapted to receive one or more weights, said weights, respectively, being provided with similarly formed and shaped surfaces two of which are in contact when a large weight and a small weight are nested in a single pocket.

7. A weight retainer for attachment to the rim of a vehicle wheel, comprising concentric cylindrical parts fabricated of sheet material and together defining a weight-receiving and retaining slot and a sheet material part extending across and forming the rear wall of such slot, said last mentioned part comprising a laterally deflected integral extension of one of said first mentioned parts.

8. A weight retainer for attachment to the rim of a vehicle rim, comprising concentric cylindrical parts fabricated of sheet material and together defining a weight-receiving and retaining slot, and a sheet material part extending across and forming the rear wall of said slot, said last mentioned part being provided with an annular flange extending inwardly and adapted to receive securing devices by means of which the retainer may be secured to the rim of a wheel.

9. In a vehicle wheel, a metallic rim having an inwardly facing cylindrical surface and a frusto-conical surface adjacent and concentric with said cylindrical surface, and an annular weight retainer secured to said rim, said retainer having a generally cylindrical part the outer surface of which is in contact with the cylindrical surface of said rim and a second generally cylindrical part concentric with and spaced inwardly from said first mentioned part, one of said parts having a flange like annular portion which limits the rearward movement of a weight inserted between said parts and also constitutes means for maintaining said second cylindrical part in fixed spaced relationship to said first part, said flange like annular portion constituting an integral extension of said first mentioned part of the retainer and engaging the frusto-conical surface of the rim.

10. The combination set forth in claim 9 in which the said second generally cylindrical part of the weight retainer is provided with resilient means for the retention of individual weights.

WILLIAM G. MINDER.

REFERENCES CITED

The following references are of record in the file of this patent:

UNITED STATES PATENTS

| Number | Name | Date |
|---|---|---|
| 209,475 | Harriss | Oct. 29, 1878 |
| 430,270 | Cook | June 17, 1890 |
| 1,158,712 | Nichols | Nov. 2, 1915 |
| 1,171,172 | Coppage | Feb. 8, 1916 |
| 1,191,393 | Bergstrom | July 18, 1916 |
| 1,305,978 | Spence | June 3, 1919 |
| 2,237,501 | Purvis | Apr. 8, 1941 |
| 2,280,637 | Kraft | Apr. 21, 1942 |